United States Patent
Ashe

(10) Patent No.: US 6,999,188 B1
(45) Date of Patent: Feb. 14, 2006

(54) DYNAMICALLY CONFIGURABLE PRINTER AND METHOD OF USE THEREOF

(75) Inventor: Steven M. Ashe, Boulder, CO (US)

(73) Assignee: Konica Minolta Printing Solutions U.S.A., Inc., Mobile, AL (US)

( * ) Notice: Subject to any disclaimer, the term of this patent is extended or adjusted under 35 U.S.C. 154(b) by 964 days.

(21) Appl. No.: 09/699,885

(22) Filed: Oct. 30, 2000

(51) Int. Cl.
*G06F 15/00* (2006.01)

(52) U.S. Cl. ............... 358/1.15; 358/1.13; 358/1.9; 709/201

(58) Field of Classification Search ............... 358/1.15, 358/1.13, 1.16, 1.1, 1.9; 709/201
See application file for complete search history.

(56) References Cited

U.S. PATENT DOCUMENTS

| | | | | |
|---|---|---|---|---|
| 5,371,837 A | 12/1994 | Kimber et al. | ............... | 395/114 |
| 5,550,957 A | 8/1996 | Davidson, Jr. et al. | ..... | 395/114 |
| 5,559,606 A | 9/1996 | Webster et al. | ............. | 358/296 |
| 5,566,278 A * | 10/1996 | Patel et al. | ................ | 358/1.15 |
| 5,636,333 A | 6/1997 | Davidson, Jr. et al. | ..... | 395/114 |
| 5,638,497 A | 6/1997 | Kimber et al. | ............... | 395/114 |
| 5,659,670 A | 8/1997 | AuClair | ...................... | 395/115 |
| 5,694,529 A | 12/1997 | Fromherz | .................... | 395/114 |
| 5,720,015 A | 2/1998 | Martin et al. | ................ | 395/114 |
| 5,740,331 A | 4/1998 | Goldmann et al. | ......... | 395/108 |
| 5,754,747 A | 5/1998 | Reilly et al. | ................. | 395/114 |
| 5,787,237 A | 7/1998 | Reilly | ......................... | 395/112 |
| 5,799,206 A | 8/1998 | Kitagawa et al. | ........... | 395/856 |
| 5,815,643 A | 9/1998 | Van Deurzen et al. | ...... | 395/112 |
| 5,832,191 A | 11/1998 | Thorne | ........................ | 395/114 |
| 5,835,688 A | 11/1998 | Fromherz | .................... | 395/112 |
| 5,903,716 A | 5/1999 | Kimber et al. | .............. | 395/114 |
| 5,905,906 A | 5/1999 | Goffinet et al. | ............. | 395/828 |
| 5,915,079 A | 6/1999 | Vondran, Jr. et al. | ....... | 395/114 |
| 5,918,988 A | 7/1999 | H.A.M. Van Oijen | ........ | 400/76 |
| 5,933,582 A | 8/1999 | Yamada | ....................... | 395/114 |
| 5,933,583 A | 8/1999 | Van Kuringen | ............. | 395/114 |
| 5,940,584 A | 8/1999 | Züfle | ........................... | 395/114 |
| 5,940,585 A | 8/1999 | Vondran, Jr. et al. | ....... | 395/114 |
| 5,946,457 A | 8/1999 | Nakai et al. | ................. | 395/112 |
| 5,946,458 A | 8/1999 | Austin et al. | ............... | 395/114 |
| 6,003,065 A * | 12/1999 | Yan et al. | .................... | 709/201 |
| 6,256,104 B1 * | 7/2001 | Rumph et al. | ............. | 358/1.15 |
| 6,628,413 B1 * | 9/2003 | Lee | ........................... | 358/1.15 |
| 6,671,064 B1 * | 12/2003 | Rumph et al. | ............. | 358/1.15 |
| 6,687,022 B1 * | 2/2004 | Lapstun et al. | ............. | 358/1.9 |
| 2002/0105664 A1 * | 8/2002 | Inoue et al. | ............... | 358/1.13 |

* cited by examiner

*Primary Examiner*—Kimberly Williams
*Assistant Examiner*—Satwant Singh
(74) *Attorney, Agent, or Firm*—The Webb Law Firm

(57) ABSTRACT

A printer has a controller configured to receive one or more printerlets and data from one or more computers connected thereto. Each printerlet includes one or more computer configuration instructions and the controller invokes each printer configuration instruction received in a printerlet. A memory connected to the controller stores therein a plurality of object oriented classes each configured to control at least one operation of the printer. A print engine connected to the controller to be controlled thereby prints data on print media as a function of at least one object oriented class invoked by the controller from the memory in response to the controller invoking at least one printer configuration instruction.

20 Claims, 7 Drawing Sheets

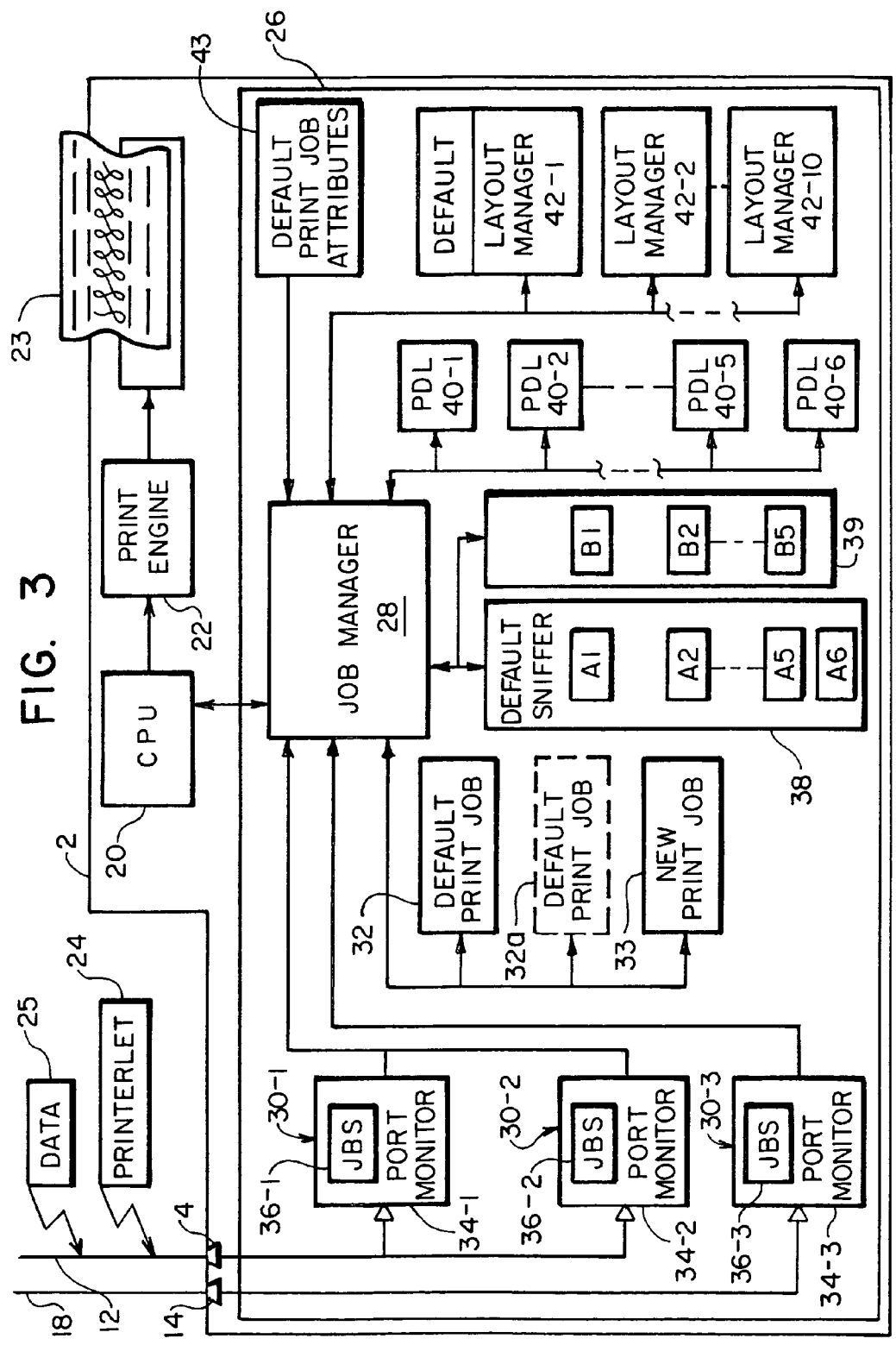

DYNAMICALLY CONFIGURABLE PRINTER AND METHOD OF USE THEREOF

BACKGROUND OF THE INVENTION

1. Field of the Invention

The present invention relates to a method for configuring a printer and, more particularly, to a method for dynamically configuring a printer through the use of printer applets or printerlets which can be downloaded into the printer.

2. Description of the Prior Art

Prior art printers utilize a page description language (PDL) interpreter, such as Adobe PostScript or Hewlett-Packard Page Control Language (PCL), resident in nonvolatile memory, i.e., ROM, of the printer for controlling the operation thereof in accordance with a print job received by the printer from a client, such as a stand-alone computer or a computer network which interconnects the printer and one or more computers utilizing a physical medium and communications protocols known in the art. A typical print job generated by a client to a printer includes PDL commands followed by print data. The PDL interpreter of the printer interprets the PDL commands received from the client and configures the printer to receive and process the print data into bitmap data which is stored in one or more page memories in volatile memory, i.e., RAM, of the printer. Once all of the bitmap data for a page memory is received thereby, the PDL interpreter causes the bitmap data for the page memory to be transferred to a print engine that prints the bitmap data on a print media.

Prior art printers include PDL interpreters that are each configured to implement a predetermined set of capabilities. Since PDL interpreters are resident in nonvolatile memories of prior art printers, the capabilities of prior art printers can only be upgraded by physically replacing present nonvolatile memories with new nonvolatile memories which include new versions or revisions of PDL interpreters and/or by adding new nonvolatile memories in the form of, for example, a printer cartridge to extend the capabilities of prior art printers.

Problems with replacing a nonvolatile memory in a printer include the time and inconvenience for a person to replace the memory as well as the need to provide appropriate technical training to enable the person to replace the memory effectively. Another problem is the delay between the time a new version or revision of PDL is needed, and thus ordered from the printer manufacturer, and the time the replacement and/or new nonvolatile memory arrives for installation in the printer. Still another problem is the need for one or more skilled programmers, either programmers of the printer manufacturer or aftermarket programmers, to implement new PDL code and the time required for such implementation.

It is an object of the present invention to overcome the above problems and others by providing a method of controlling a printer to implement various print configurations using a high-level interpretive language, with the functional components of the printer operating in a run-time environment of that interpretive language. It is an object of the present invention to provide a method of configuring the capabilities of a printer when a client generates a print job. It is an object of the present invention to provide a method of upgrading the capabilities of a printer and operating the printer in accordance with such upgrade when a client generates a print job. Still other objects will become apparent to those of ordinary skill in the art upon reading and understanding the following detailed description.

SUMMARY OF THE INVENTION

Accordingly, I have invented a method of controlling a printer to print data on print media. The method includes providing a printer having memory including a plurality of object oriented classes stored therein. Each object oriented class is configured to control at least one operation of the printer. The memory includes a virtual port which is associated with a physical port of the printer. At least one printerlet having at least one printer configuration instruction is received at the virtual port and each printer configuration instruction is invoked. Data is also received at the virtual input port. At least one object oriented class is invoked as a function of at least one invoked printer configuration instruction. The data is processed as a function of the at least one invoked object oriented class and the processed data is printed on print media.

The plurality of object oriented classes preferably includes a sniffer class having one or more sniffer objects for detecting the type of data received at the virtual input port; a plurality of page description language (PDL) classes, with each PDL class associated with a sniffer object; or a plurality of layout manager classes, with each manager layout class for converting the received data from a virtual page to a physical page which is printed on the print media. Each object oriented class preferably includes one or more procedures which operate on the data received at the virtual input port with the one or more printerlets.

The method preferably includes detecting for the presence of the at least one printerlet and an incoming datastream received at the virtual input port. In response to detecting the at least one printerlet in the incoming datastream, a printerlet processing routine is invoked which reads, loads, and instantiates each printer configuration instruction in the detected printerlet. A print job class is created that includes a script for processing the data. The script includes the name of at least one object oriented class which was included in the script as a function of at least one printer configuration instruction and the data is processed in accordance with the script.

Preferably, each printer configuration instruction is an interpretative command which is translated and executed in real time.

I have also invented a printer that includes a controller configured to receive one or more printerlets and data from one or more computers connected thereto. Each printerlet includes one or more printer configuration instructions and the controller invokes each printer configuration instruction. A memory is connected to the controller. The memory includes a plurality of object oriented classes stored therein. Each object oriented class is configured to control at least one operation of the printer. A print engine is also connected to the controller to be controlled thereby to print data on print media as a function of at least one object oriented class invoked by the controller from the memory in response to the controller invoking at least one printer configuration instruction. Each object oriented class preferably includes one or more procedures which operate on the data.

Each printer configuration instruction is preferably an interpretative instruction that is translated by the controller. In response to invoking at least one translated printer configuration instruction, the controller causes a script, which is instantiated in the memory in response to the printer receiving the incoming data, to include a name of the at least one object oriented class. The controller preferably operates the print engine in accordance with the script.

I have also invented a printer connectable to one or more computers. The printer includes control means connected to one or more computers for receiving therefrom one or more printerlets and data. A computer storage means is connected to the control means and stores therein a plurality of object oriented classes invocable by the control means. Each object oriented class is configured to control at least one operation of the printer. A print means is connected to the control means. The print means prints data on print media in response to receiving commands from the control means. The control means is responsive to the one or more printerlets for causing at least one object oriented class to be invoked for processing the data. The control means processes the data as a function of the invoked object oriented class and the control means issues commands to the print means as a function of the processing of the data.

Preferably, the control means invokes a port monitor class which monitors for incoming data including printerlets and data. In response to detecting a printerlet in the incoming data, the port monitor class causes the control means to invoke an interpreter for interpreting the printerlet. The control means instantiates a print job having a script that includes the name of at least one object oriented class that was included in the script as a function of the invocation of the interpreted printerlet. The control means processes the data in accordance with the script.

As a function of the invocation of the interpreted printerlet, the control means can add to the computer storage means a new object oriented class. The control means can invoke the new object oriented class as a function data type of the data.

The control means can also invoke a port monitor class which monitors for incoming data including printerlets and data. In response to detecting a printerlet in the incoming data, the port monitor class can cause the control means to invoke an interpreter for interpreting the printerlet. As a function of the invocation of the interpreted printerlet, the control means can add to the computer storage means a new object oriented class. The control means can invoke the new object oriented class as a function of the type of data.

The control means can also instantiate a print job having a script that includes the name of at least one object oriented class that was included in the script as a function of the invocation of the interpreted printerlet. The control means can process the data in accordance with the script.

Lastly, I have invented a method of controlling a printer that includes providing a printer having a memory including a plurality of object oriented classes stored therein, with each class configured to control at least one operation of the printer. A virtual input port in the memory is associated with a physical input port of the printer. When data is received at the virtual input port, at least one object oriented class is invoked as a function of the type of data. The data is processed as a function of the at least one invoked object oriented class and the processed data is printed on print media.

A printerlet having at least one printer configuration instruction can also be received at the virtual input port. Each printer configuration instruction can be invoked and another one of the object oriented classes can be invoked as a function of the at least one invoked printer configuration instruction.

Preferably, the present invention is implemented in the control software of the printer. This control software is implemented in the JAVA programming language which enables printer applets, or printerlets, to be sent from a client, such as stand-alone computer, computer network or from the Internet. The JAVA programming language is implemented in a run-time environment that allows for strict print job control to be achieved through a multi-threaded architecture. This allows the printer to start one thread of execution for each print job, keeping control of that job until completion.

Because the control software of the printer is implemented in the JAVA programming language, configuration of the printer can be hardware independent and the printer's functions are only limited to the extent of the printerlet received by the printer and the one or more printer configuration instruction contained in the printerlet.

BRIEF DESCRIPTION OF THE DRAWINGS

FIG. 2b is a block diagram drawing of a thread of execution of a default print job class shown in FIG. 2a;

FIG. 2c is a block diagram of another thread of execution of a new print job class shown in FIG. 2a;

FIG. 3 is a block diagram drawing of the printer shown in FIG. 2a including block diagrams of a new default sniffer class, a new class of sniffer vectors and a new PDL.

DESCRIPTION OF THE PREFERRED EMBODIMENTS

The present invention will be described with reference to the accompanying Figures where like reference numbers correspond to like elements.

Figure 1:
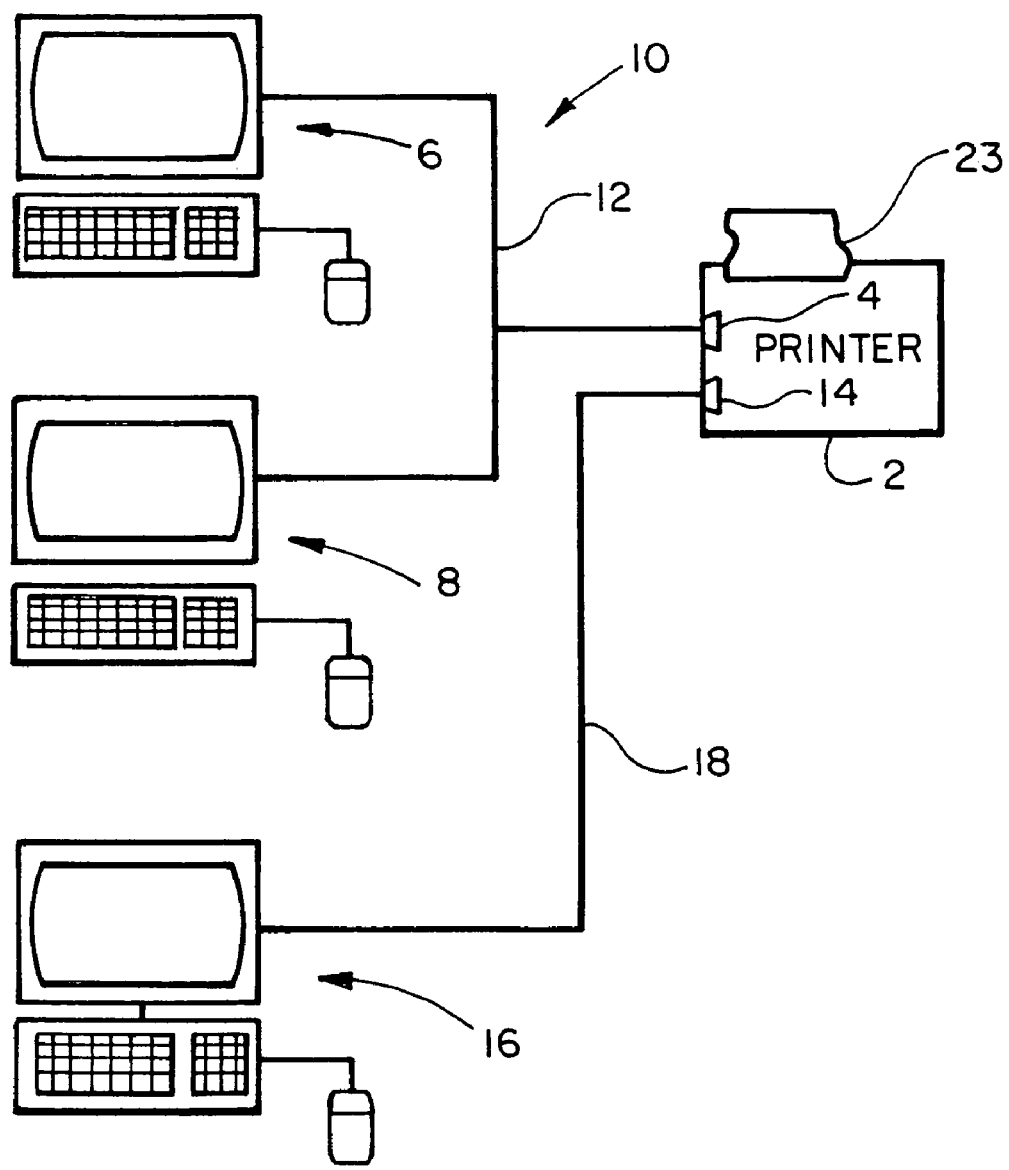
FIG. 1 is a block diagram drawing of a printer in accordance with the present invention connected to a computer network and/or stand-alone computer.

With reference to FIG. 1, a printer 2 in accordance with the present invention includes a physical input port 4 configured to be connected to receive print instruction and data from two or more computers 6 and 8 connected to physical input port 4 via a computer network 10. The computer network 10 includes software which is installed on the two or more computers 6 and 8 and a physical link 12, such as a coaxial cable, which connects the two or more computers 6 and 8 to the physical input port 4. Alternatively, printer 2 includes a physical input port 14 configured to be connected directly to a stand-alone computer 16 via a dedicated printer cable 18. Printer 2 can also include both physical input port 4 and physical input port 14 for connection to computer network 10 via physical link 12 and stand-alone computer 16 via printer cable 18, respectively.

Figure 2A:
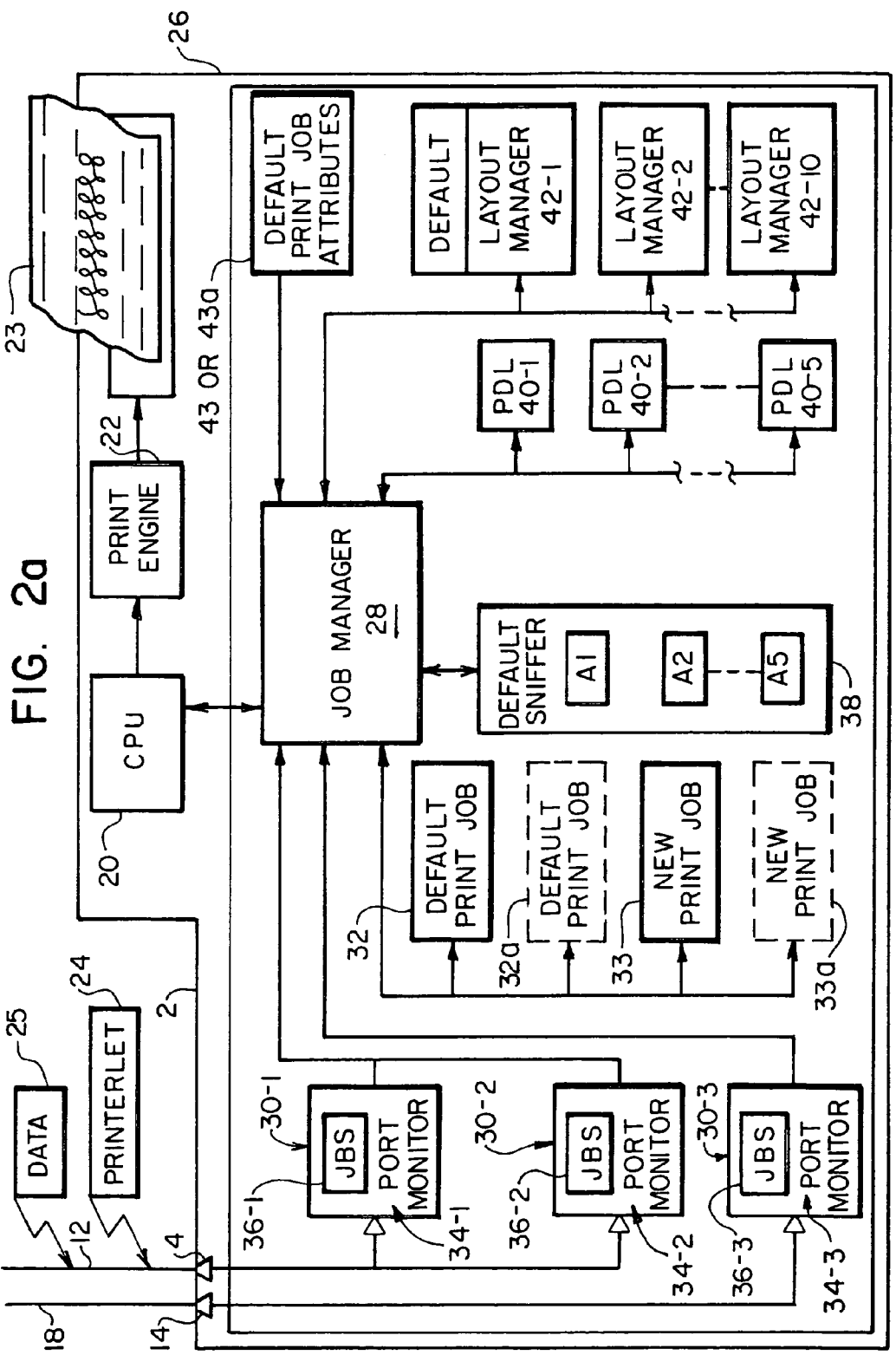
FIG. 2a is a block diagram drawing of the printer of FIG. 1 including physical components and a memory having a job manager and a default configuration of object oriented classes.

With reference to FIG. 2a, and with continuing reference to FIG. 1, printer 2 can receive an incoming datastream from computer network 10 and, more particularly, from physical link 12. Printer 2 can also receive an incoming datastream from stand-alone computer 16 via printer cable 18. Preferably, each incoming datastream includes data 25 and/or one or more printerlets 24 which will be described in greater detail hereinafter.

Printer 2 includes a central processing unit (CPU) 20 which operates on the incoming datastream and which controls the operation of a print engine 22 as a function of a software program stored in a memory 26. This results in print engine 22 producing letters, characters, and/or graphics on a print media 23, such as paper, in accordance with the incoming datastream received by printer 2 via physical link 12. Preferably, the software program is implemented in the JAVA programming language and includes a plurality of object oriented classes as follows: job manager 28; one or more default print jobs 32; one or more port monitors 34; one or more JAVA bytecode scanners (JBS) 36; a default sniffer 38; one or more page description languages (PDL) 40-1 through 40-5; a default layout manager 42-1; and one or more additional layout managers 42-2 through 42-10.

Physical input port 4 can be, for example, an Ethernet port that is configured to host multiple virtual input ports 30-1 and 30-2. In contrast, physical input port 14 can be configured to host one virtual input port 30-3. Port monitor classes 34-1 through 34-3 are configured to monitor virtual input ports 30-1 through 30-3, respectively, for incoming datastreams. The use of port monitor classes 34-1 and 34-2 and corresponding virtual input ports 30-1 and 30-2 for monitoring physical input port 4 is well-known in the art and will not be described in detail herein.

The operation of the software program in response to receiving data 25 on physical input port 4 will now be described. In operation, job manager 28 sequentially causes each port monitor 34-1 through 34-3 to poll its corresponding virtual input port 30-1 through 30-3 for incoming data 25. More specifically, job manager 28 creates from a. JAVA library class a server socket (not shown) which functions as an interface between job manager 28 and the port monitor 34 being polled. In response to detecting incoming data 25 on its corresponding virtual input port 30-1 through 30-3, the port monitor 34-1 through 34-3 detecting the incoming data 25 causes job manager 28 to instantiate, or create an instance of, default print job 32.

Figure 2B:
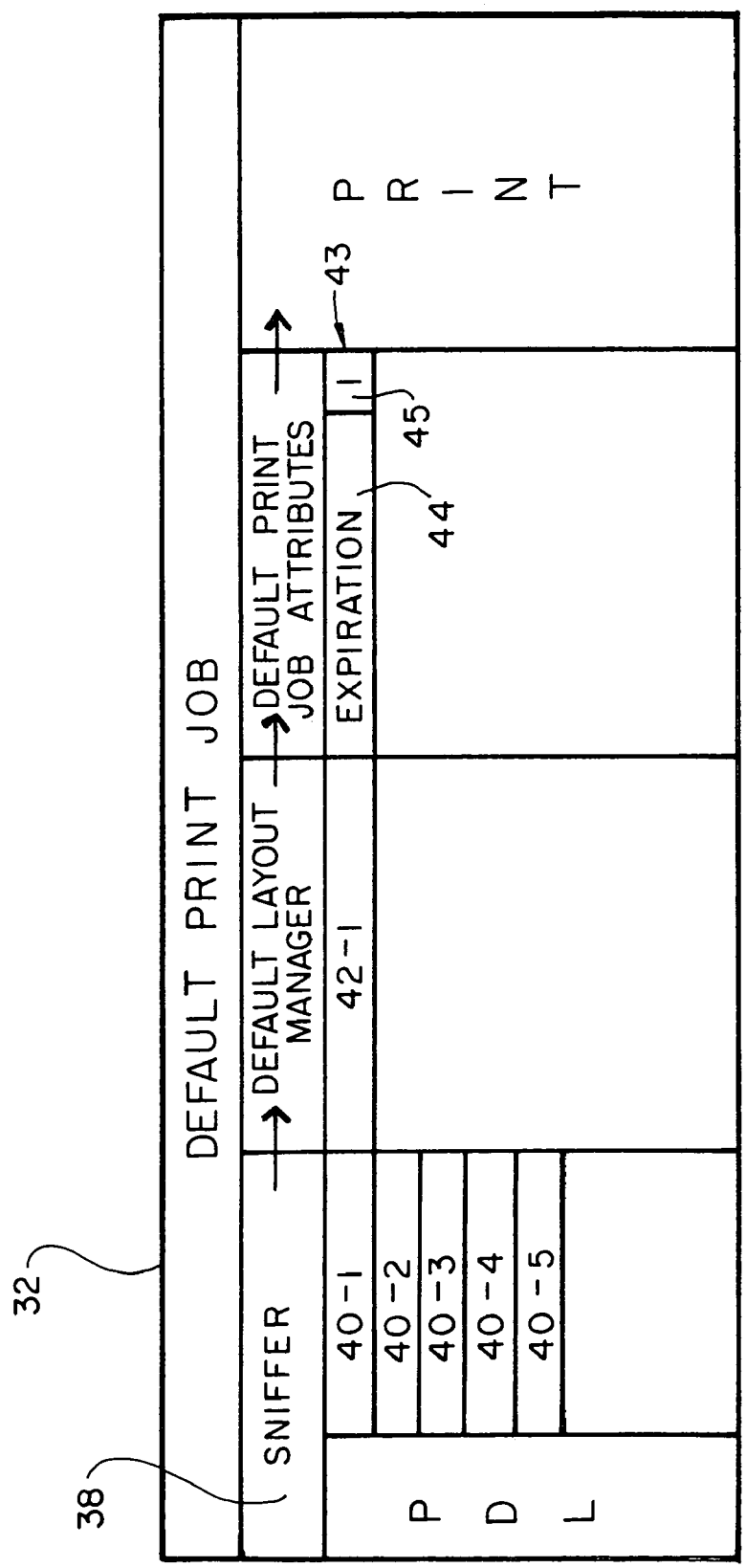

With reference to FIG. 2b, and with continuing reference to FIG. 2a, default print job 32 is a script which defines a thread of execution that provides the necessary steps to print data 25 on print media 23. Default print job 32 includes the name of sniffer 38, the name of default layout manager 42-1 and one or more default print job attributes 43 which are retrieved from memory 26 and inserted into default print job 32 when it is instantiated. Preferably, each default print job attribute 43 includes an operation identifier 44, e.g., "expiration" and/or an operand 45, e.g., "1". Each operation identifier 44 identifies to job manager 28 the operation to be affected by the corresponding operand 45. For example, in response to reading operation identifier 44 having a name "expiration" and corresponding operand 45 having a value of "1" during execution of default print job 32, job manager 28 deletes default print job 32 after executing one print job, i.e., after print engine 22 prints data 25 on print media 23 one time. In contrast, if operation identifier 44 "expiration" has an operand 45 with a value of "2", job manager 28 will utilize default print job 32 twice to cause print engine 22 to print two different print jobs, i.e., print two separate streams of data 25, received from the same user. After the second print job, job manager 28 deletes default print job 32. While described as having one default print job attribute 43, default print job 32 can have more than one default print job attribute 43, with each default print job attribute 43 controlling a unique programmable function of printer 2. Printerlets 24, which will be described in greater detail hereinafter, can be utilized to add or delete default print job attributes 43 from memory 26 or to modify default print job attributes 43 in memory 26.

Job manager 28 administers all threads of execution through creation, deletion, or modification. When default print job 32 is instantiated, job manager 28 commences processing data 25 in accordance with the thread of execution defined in default print job 32. Specifically, in response to executing the thread of execution defined by default print job 32, job manager 28 retrieves the name of default sniffer 38 from default print job 32. In response to retrieving the name of default sniffer 38, job manager 28 invokes default sniffer 38.

Default sniffer 38 includes plural vectors of known sniffer objects, e.g., A1–A5, each configured to detect a particular data type at varying reliability levels (deterministic, probabilistic and heuristic). Preferably, each sniffer object A1–A5 has associated therewith a corresponding registered PDL 40-1 through 40-5. In response to being invoked, default sniffer 38 sequentially invokes sniffer objects A1–A5 until one of the sniffer objects A1–A5 uniquely identifies the data type of data 25. Thereafter, the sniffer object identifying the data type supplies to job manager 28 the name of the corresponding PDL that is able to process data 25. For example, if the data type of data 25 is identified by sniffer object A1, sniffer object A1 supplies to job manager 28 the name of its corresponding registered PDL, e.g., PDL 40-1. In response to receiving the name of a registered PDL, job manager 28 invokes the PDL to process data 25.

When the PDL invoked by job manager 28 completes processing data 25, job manager 28 determines the layout manager 42 to be utilized to layout the data processed by the PDL. Specifically, job manager 28 retrieves from default print job 32 the name of the layout manager 42 to be utilized and invokes this layout manager 42. For example, if default print job 32 includes the name of default layout manager 42-1, job manager 28 retrieves this name from default print job 32 and invokes default layout manager 42-1. When invoked, default layout manager 42-1 arranges the processed data 25 into a form for printing by print engine 22. Thereafter, job manager 28 causes print engine 22 to print the data 25 on print media 23 in accordance with the processing of data 25 by the invoked PDL and the arrangement of the processed data by default layout manager 42-1.

At an appropriate time, job manager 28 reads one or more default print job attributes 43 from default print job 32. In the example shown in FIG. 2a, the operation identifier 44 "expiration" has an operand 45 with a value of "1". Thus, when job manager 28 completes the thread of execution defined by default print job 32, job manager 28 deletes this instance of default print job 32.

In the examples described above in connection with FIGS. 2a and 2b, the incoming datastream included only data 25. However, the incoming datastream can also include one or more printerlets 24, either alone or accompanied by data 25. A printerlet 24 corresponds to an applet in the JAVA programming language. Each printerlet 24 includes one or more printer configuration instructions, with each printer configuration instruction corresponding to a JAVA command in the JAVA programming language. A printer configuration instruction can, without limitation, report and/or modify the print environment, perform administrative functions, change the default setup (e.g., change sniffers), query and/or manipulate resources such as print job attributes, change processing policies, change the user interface, synthesize jobs, operate as a PDL, communicate with administrative agents over a network, etc.

In order to detect a printer configuration instruction in a printerlet 24, each port monitor 34-1 through 34-3 preferably includes a corresponding JBS 36-1 through 36-3 which is invoked in response to printer 2 receiving printerlet 24. Specifically, if a virtual input port 30 receives an incoming datastream, the corresponding port monitor 34 invokes its corresponding JBS 36 to detect for the presence of a printerlet 24 in the incoming datastream. If a printerlet 24 is not detected, the port monitor 34 detecting the incoming datastream causes job manager 28 to instantiate default print job 32 and commence operation in accordance therewith. However, if a printerlet 24 is detected, the JBS 36 detecting the printerlet 24 invokes a JAVA interpreter which is included as part of job manager 28. The JAVA interpreter invokes a printerlet class loader which reads, loads and instantiates the one or more printer configuration instructions included in the printerlet 24.

Figure 2C:
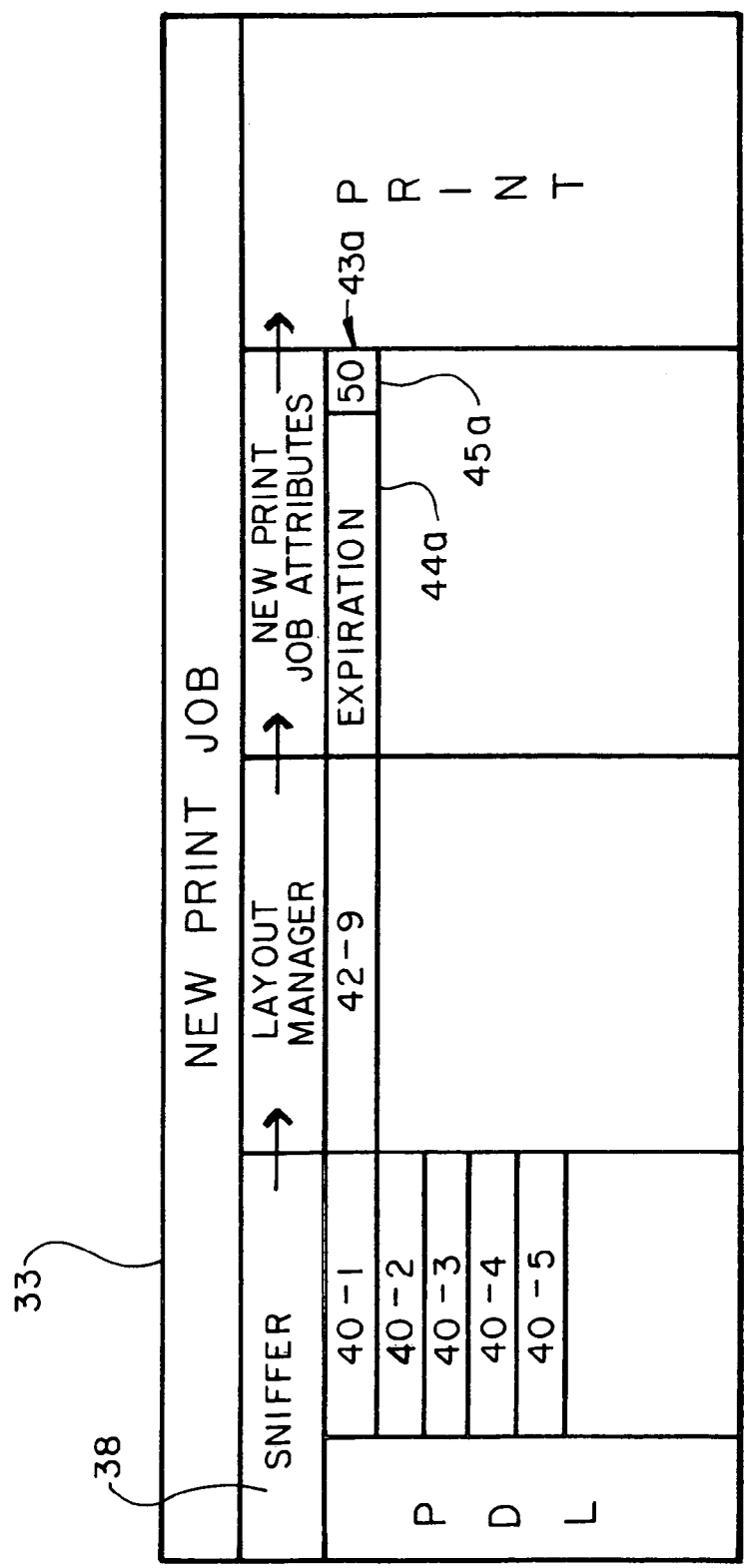

With reference to FIG. 2c, and with continuing reference to FIGS. 2a and 2b, in the absence of a printerlet 24, the thread of execution defined by default print job 32 only changes in response to one of the sniffer objects A1–A5 supplying the name of its corresponding PDL to job manager 28 in response to identifying the data type of data 25. For example, if sniffer A1 identifies the type of data 25, sniffer A1 supplies the name of corresponding registered PDL 40-1 to job manager 28. Similarly, if sniffer A2 identifies the type of data 25, sniffer A2 supplies the name of corresponding registered PDL 40-2 to job manager 28. To the contrary, the one or more printer configuration instructions of printerlet 24 can cause job manager 28 to extend the class of default print job 32 to form new print job 33 which has a script which utilizes a different layout manager 42, e.g., 42-9, and/or which has one or more new print job attributes 43a than default print job 32.

The one or more new print job attributes 43a can be retrieved from memory 26 or downloaded into memory 26 via one or more of the printer configuration instructions of printerlet 24. Similarly, the name of the different layout manager 42 included in new print job 33 can be: (i) obtained by job manager 28 from the names of the layout managers present in memory 26 and registered with job manager 28; (ii) included by job manager 28 in new print job 33 when a different layout manager 42 is added to memory 26 via one or more of the printer configuration instructions of printerlet 24; or (iii) formed by a printer configuration instruction of printerlet 24 which causes job manager 28 to extend an existing class of layout manager 42 to form the new layout manager 42.

Once new print job 33 is instantiated in connection with the port monitor 34 detecting the printerlet 24 with incoming datastream, job manager 28 commences operation in accordance with the script of new print job 33 as described above in connection with FIGS. 2a and 2b.

The example of new print job 33 shown in FIG. 2c includes layout manager 42-9, new print job attribute 43a having an operation identifier 44a named "expiration", and an operand 45a having a value of "50". The value "50" of operand 45a causes job manager 28 to utilize the thread of execution defined by new print job 33 for the next fifty print jobs received from the same user as the printerlet 24. This enables the next fifty print jobs received by printer 2 from the user to maintain the same print format while avoiding the need to transmit one or more new printerlets 24.

To enable job manager 28 to process the next fifty print jobs received from the same user utilizing new print job 33, a unique header to be included in the print jobs from the user is stored as another new print job attribute (not shown) of new print job 33. Thereafter, when the unique header is detected in a print job received at the virtual input port 30 associated with new print job 33, job manager 28 searches the new print job attributes of new print job 33 for a match between the unique header in the print job and the unique header stored as a new print job attribute. If a match is detected, job manager 28 utilizes new print job 33 to process the print job. If a match is not detected, however, job manager 28 instantiates and invokes default print job 32 utilizing a registered PDL 40 based upon the type of data 25 detected by a sniffer object A1–A5 of default sniffer 38.

After processing each print job from the user, job manager 28 decrements the value of operand 45a and determines whether the value of operand 45a is "0". If not, job manager 28 retains new print job 33 in memory 26. If, however, operand 45a is "0", job manager 28 deletes this instance of new print job 33.

Preferably, plural default print jobs 32 and/or new print jobs 33 can be instantiated and can reside concurrently in memory 26 for two or more incoming datastreams received at one or more virtual input ports 30. For example, job manager 28 can instantiate default print job 32 and new print job 33 for two incoming datastreams received at one virtual input port 30, e.g., 30-1, or for two incoming datastreams received at two virtual input ports 30, e.g., 30-1 and 30-3. In this example, default print job 32 is attached to, or associated with, a datastream having data 25 and new print job 33 is attached to a datastream which includes a printerlet 24, and which may also include data 25. Thereafter, job manager 28 can execute the threads of execution defined by default print job 32 and new print job 33.

Job manager 28 can also instantiate default print job 32 and a default print job 32a for two incoming datastreams having data 25 with different data types received at one virtual input port 30, e.g., 30-1. Thereafter, job manager 28 can execute the threads of execution defined by default print jobs 32 and 32a.

Furthermore, job manager 28 can instantiate default print job 32 and new print job 33 for two incoming datastreams received at one virtual input port 30, e.g., 30-1, where one incoming datastream includes only data 25 and the other incoming datastream includes a printerlet 24 and, possibly, data 25. Thereafter, job manager 28 can execute the threads of execution defined by default print job 32 and new print job 33.

Still further, job manager 28 can instantiate new print job 33 and new print job 33a for two incoming datastreams received at one virtual input port 30, e.g., 30-1, or for two incoming datastreams received at two virtual input ports 30, e.g., 30-1 and 30-2, where each incoming datastream includes a printerlet 24 and, possibly, data 25. Thereafter, job manager 28 can execute the threads of execution defined by new print jobs 33 and 33a.

With reference to FIG. 3, a printerlet 24 can also be utilized by job manager 28 to invoke a new combination of PDL 40 and layout manager 42. For example, one or more printer configuration instructions included in a printerlet 24 can cause job manager 28 to extend default sniffer 38 to include a new sniffer object A6, or can download into memory 26 a new sniffer 39 which includes plural vectors of new sniffer objects, e.g., B1–B5, or can extend default sniffer 38 to form new sniffer 39 in memory 26. New sniffer object A6 and/or new sniffer class 39 enables printer 2 to detect additional data types.

Printerlet 24 can also be utilized to add one or more new PDLs, e.g., PDL 40-6, to memory 26 and to register the one or more new PDLs with job manager 28. The new PDL 40-6 can be downloaded into memory 26 or can be formed by extending a class of a PDL 40 already in memory 26. If new PDL, e.g., 40-6, is added to memory 26 at the same time as its corresponding new sniffer object, e.g., A6, the new sniffer object will be able to supply job manager 28 with the name of the new registered PDL. For example, if new sniffer object A6 recognizes the type of data 25 received at virtual input port 30-1, new sniffer object A6 returns to job manager 28 the name of corresponding registered PDL 40-6. In response to receiving the name of a registered PDL 40-6, job manager 28 invokes PDL 40-6 to process data 25.

When PDL 40-6 completes processing data 25, job manager 28 invokes default layout manager 42-1 which causes job manager 28 to arrange the processed data 25 into a form for printing by print engine 22. Thereafter, job manager 28 causes print engine 22 to print the data 25 on print media 23 in accordance with the processing of data 25 by the invoked PDL and the arrangement of the processed data by default layout manager 42-1.

In addition, as discussed above, one or more printer configuration instructions included in a printerlet 24 can be utilized to create new print job 33 having the name of a layout manager 42 other than default layout manager 42-1. Thus, by creating new print job 33 having the name of a new layout manager 42, adding a new PDL 40 to memory 26 and creating new sniffer object A6 which supplies the name of the new PDL to job manager 28, new combinations of PDL 40 and layout manager 42 can be invoked to process data 25.

With reference back to FIGS. 2a and 2b, as discussed above, printerlet 24 can be used to reconfigure default print job 32 to new print job 33 which includes a script different than the script defined in default print job 32. For example, if a user wishes to print graphics in thumbnail form, i.e., multiple images reduced in size to fit on one printed page, but default print job class 32 is configured to print each incoming image in full-size on separate pages, a printerlet 24 can be sent to printer 2 when the print command is issued by the user. This printerlet 24 can include one or more printer configuration instructions which reconfigure default print job 32 to new print job 33 by replacing the name of default layout manager 42-1 with the name of a different layout manager, e.g., 42-10, specifically configured to process graphics as thumbnails.

Thereafter, job manager 28 invokes default sniffer 38, the PDL associated with the sniffer object which identifies the incoming data 25, layout manager 42-10 and any default print job attributes, to process the incoming data 25 into print engine data which print engine 22 prints on print media 23. When this thread of execution has run, job manager 28 deletes this instance of new print job 33.

Figure 4A:
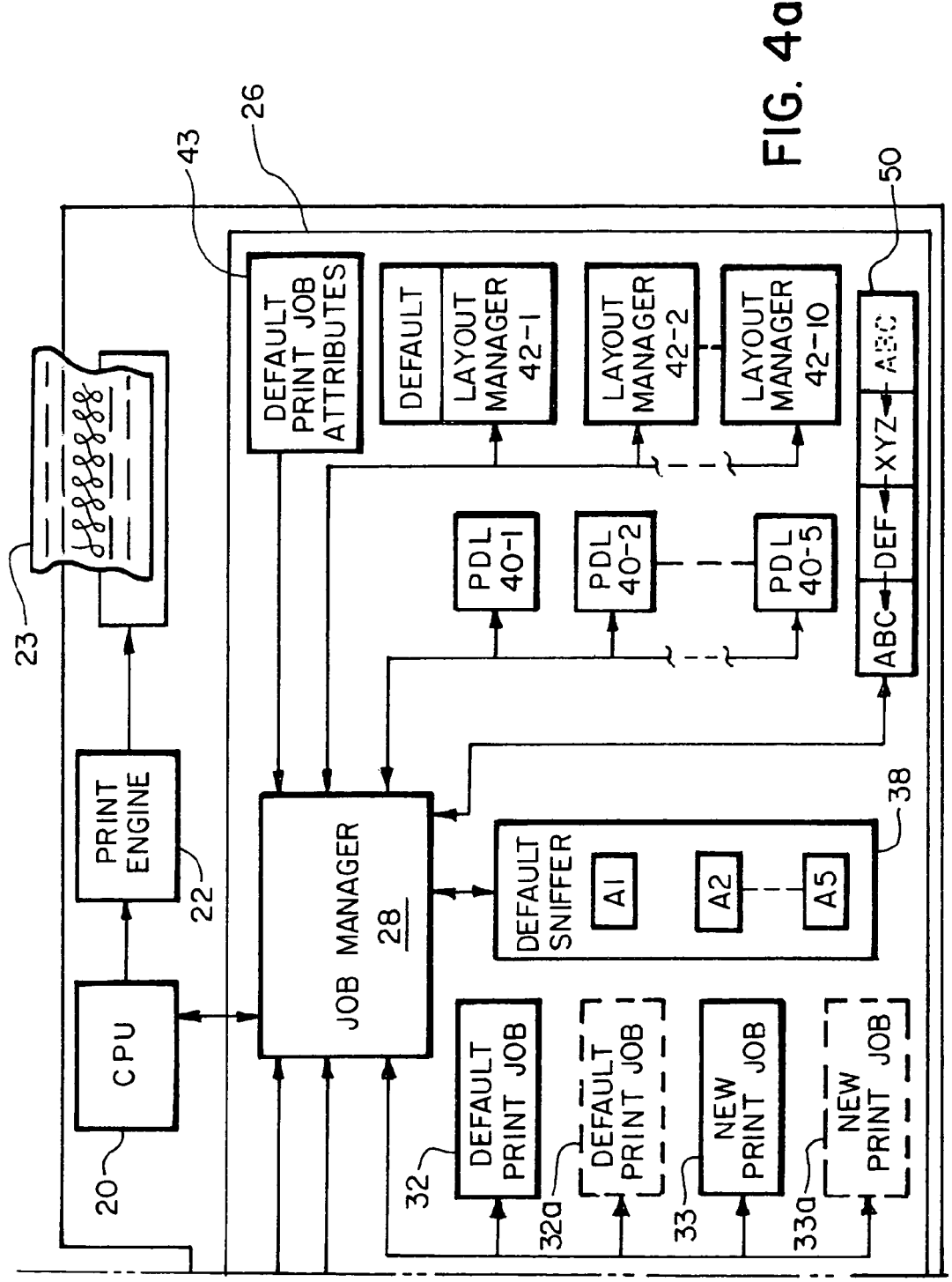
FIGS. 4a and 4b are block diagram drawings of the printer shown in FIG. 2a including a trigger and event associated with one of the port monitors and a print queue.
Figure 4B:
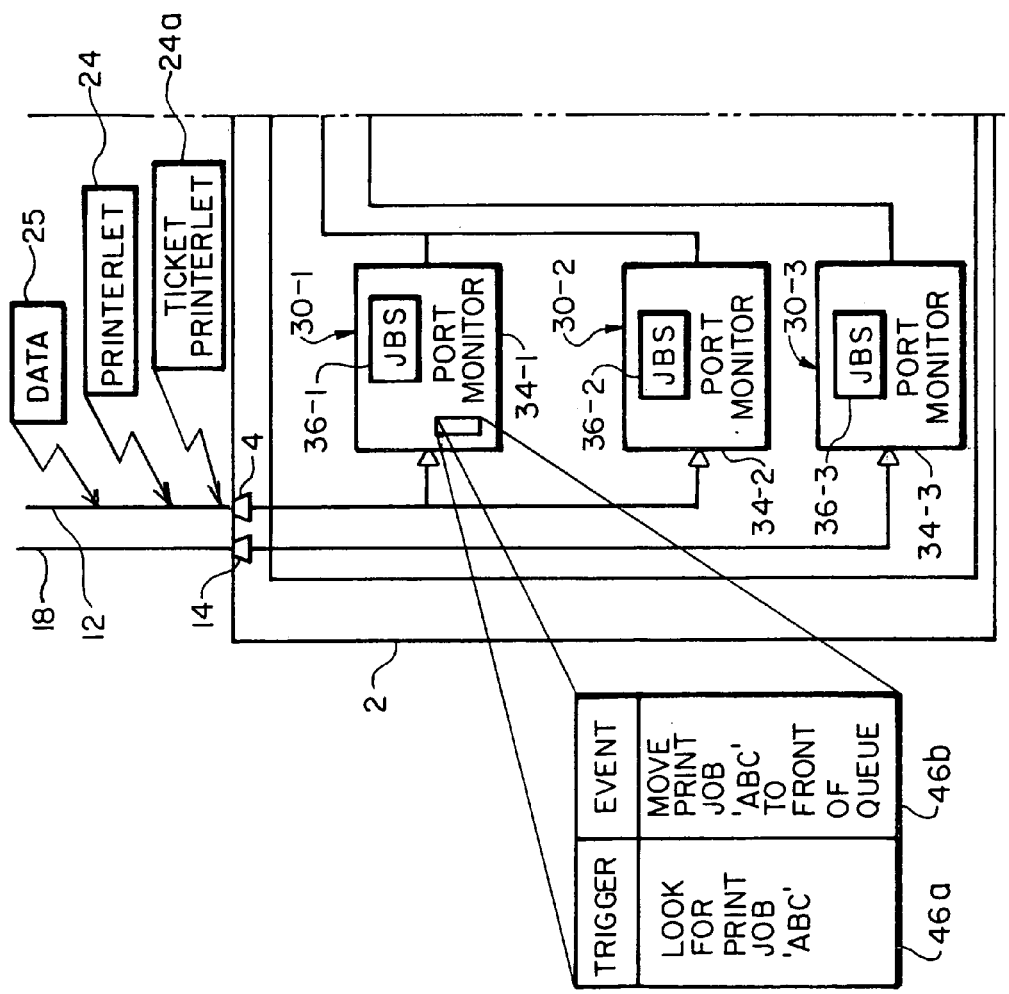

With reference to FIGS. 4a and 4b, a printerlet 24 can also be used to program a port monitor 34-1 to execute a specific operation upon receiving certain data 25. Specifically, printerlet 24 can modify a port monitor 34, e.g., 34-1, to include a unique header data or trigger 46a and an event 46b. In response to detecting a match between header data in incoming data 25 and unique header 46a, job manager 28 invokes event 46b. For example, a client named "ABC" wishes its print jobs to have priority over anything currently in a print queue 50 managed by job manager 28. The client would send to printer 2 a printerlet 24 which modifies port monitor 34 to include unique header 46a "ABC" and corresponding event 46b which causes job manager 28 to move the print job having header data "ABC" to the front of print queue 50. In response to detecting a match between header data "ABC" in incoming data 25 and unique header 46a, job manager 28 invokes event 46b which causes job manager 28 to move print job "ABC" to the front of the print queue 50. This modified port monitor 34 could remain in memory 26 until printer 2 receives another printerlet 24, which modifies or deletes unique header 46a and event 46b from the modified port monitor 34 or until a value of operand 45a associated with the identifier 44a named "expiration" expires.

Moreover, a special type of printerlet 24 known as a ticket printerlet 24a can also be utilized to temporarily reconfigure printer 2. Specifically, in response to receiving a ticket printerlet 24a, the JAVA interpreter invokes the printerlet class loader which reads, loads and instantiates one or more printer configuration instructions included in ticket printerlet 24a. Ticket printerlet 24a causes job manager 28 to modify the script of default print job 32 or new print job 33 for the data 25 accompanying ticket printerlet 24a. For example, ticket printerlet 24a can modify default print job 32 to avoid using default sniffer 38 and to process data 25 accompanying ticket printerlet 24a using a specific PDL 40 and/or a specific layout manager 42 identified in the ticket printerlet 24a. When job manager 28 completes processing data 25 according to the modified default print job 32, job manager 28 returns the modified default print job 32 to its original state and deletes ticket printerlet 24a.

In this manner, ticket printerlet 24a can be utilized to temporarily reconfigure the operation of printer 2 to process data 25 accompanying the ticket printerlet 24a. Ticket printerlet 24a avoids the need to send a first printerlet 24 to modify default print job 32 or new print job 33 to process data 25 and a second printerlet 24 to return default print job 32 or new print job 33 to its original state for processing of subsequently received data 25.

As can be seen, the present invention provides a method of controlling printer 2 to implement various print configurations using a high-level interpretive language, such as JAVA, with the functional components of printer 2 operating in a run time environment of that interpretive language. The present invention also provides a method of configuring the capabilities of a printer when a client generates a print job and enables upgrading of the capabilities of printer 2 and operating printer 2 in accordance with such upgrade when a client generates a print job.

The invention has been described with reference to the preferred embodiments. Obvious modifications, combinations, and alterations will occur to others upon reading and understanding the preceding detailed description. It is intended that the invention be construed as including all such modifications and alterations insofar as they come within the scope of the appended claims or the equivalents thereof.

I claim:

1. A method of controlling a printer to print data on print media, the method comprising the steps of:
    (a) providing a printer having memory including a plurality of object oriented classes stored therein, with each class configured to control at least one operation of the printer;
    (b) associating a virtual input port in the memory with a physical input port of the printer;
    (c) receiving at the virtual input port at least one printerlet having at least one printer configuration instruction;
    (d) invoking each printer configuration instruction;
    (e) receiving data at the virtual input port;
    (f) invoking at least one object oriented class as a function of at least one invoked printer configuration instruction;
    (g) processing the data as a function of the at least one invoked object oriented class; and
    (h) printing the processed data on print media.

2. The method as set forth in claim 1, wherein each printer configuration instruction is an interpretive command.

3. A method of controlling a printer to print data on print media, the method comprising the steps of:
- (a) providing a printer having memory including a plurality of object oriented classes stored therein, with each class configured to control at least one operation of the printer;
- (b) associating a virtual input port in the memory with a physical input port of the printer;
- (c) receiving at the virtual input port at least one printerlet having at least one printer configuration instruction;
- (d) invoking each printer configuration instruction;
- (e) receiving data at the virtual input port,
- (f) invoking at least one object oriented class as a function of at least one invoked printer configuration instruction;
- (g) processing the data as a function of the at least one invoked object oriented class; and
- (h) printing the processed data on print media, wherein the plurality of object oriented classes includes at least one of:
- a sniffer class having one or more sniffer objects for detecting the type of data received at the virtual input port;
- a plurality of page description language (PDL) classes, with each PDL class associated with a sniffer object; and
- a plurality of layout manager classes, with each layout manager class for converting the received data from a virtual page to a physical page which is printed on the print media.

4. The method as set forth in claim 3, wherein the plurality of layout manager classes implement at least two of the following:
- straight through printing;
- two-sided printing;
- two pages of a book on a single page in landscape;
- fit to page;
- thumbnail;
- collate;
- merge two or more print jobs onto a single page;
- N-up, where N is the number of pages printed on a single page;
- print separate colors on separate pages; and
- translation between software languages.

5. The method as set forth in claim 1, wherein each class includes one or more procedures which operate on the data received at the virtual input port with the one or more printerlets.

6. A method of controlling a printer to print data on print media, the method comprising the steps of:
- (a) providing a printer having memory including a plurality of object oriented classes stored therein, with each class configured to control at least one operation of the printer;
- (b) associating a virtual input port in the memory with a physical input port of the printer;
- (c) receiving at the virtual input port at least one printerlet having at least one printer configuration instruction;
- (d) invoking each printer configuration instruction;
- (e) receiving data at the virtual input port;
- (f) invoking at least one object oriented class as a function of at least one invoked printer configuration instruction;
- (g) processing the data as a function of the at least one invoked object oriented class; and
- (h) printing the processed data on print media, wherein each printer configuration instruction is an interpretive command, wherein step (d) includes the steps of:
  - translating each printer configuration instruction in real time; and
  - executing each translated printer configuration instruction in real time.

7. A method of controlling a printer to print data on print media, the method comprising the steps of:
- providing a printer having memory including a plurality of object oriented classes stored therein, with each class configured to control at least one operation of the printer;
- associating a virtual input port in the memory with a physical input port of the printer;
- receiving at the virtual input port at least one printerlet having at least one printer configuration instruction;
- invoking each printer configuration instruction;
- receiving data at the virtual input port;
- invoking at least one object oriented class as a function of at least one invoked printer configuration instruction;
- processing the data as a function of the at least one invoked object oriented class;
- printing the processed data on print media;
- detecting for the presence of the at least one printerlet in an incoming datastream received at the virtual input port;
- in response to detecting the at least one printerlet in the incoming datastream, invoking a printerlet processing routine which reads, loads and instantiates each printer configuration instruction in the detected printerlet;
- creating a print job class that includes a script for processing the data, where the script includes the name of at least one object oriented class which was included in the script as a function of at least one printer configuration instruction; and
- processing the data in accordance with the script.

8. A printer comprising:
- a controller integral to the printer configured to receive one or more printerlets and data from one or more computers connected thereto, where each printerlet includes one or more printer configuration instructions and the controller invokes each printer configuration instruction;
- a memory connected to the controller, the memory storing therein a plurality of object oriented classes each configured to control at least one operation of the printer; and
- a print engine connected to the controller to be controlled thereby to print data on print media as a function of at least one object oriented class invoked by the controller from the memory in response to the controller invoking at least one printer configuration instruction.

9. A printer comprising:
- a controller configured to receive one or more printerlets and data from one or more computers connected thereto, where each printerlet includes one or more printer configuration instructions and the controller invokes each printer configuration instruction;
- a memory connected to the controller, the memory storing therein a plurality of object oriented classes each configured to control at least one operation of the printer; and
- a print engine connected to the controller to be controlled thereby to print data on print media as a function of at least one object oriented class invoked by the controller from the memory in response to the controller invoking at least one printer configuration instruction, wherein:
- each printer configuration instruction is an interpretive instruction that is translated by the controller;

in response to invoking at least one translated printer configuration instruction, the controller causes a script, which is instantiated in the memory in response to the printer receiving the incoming data, to include a name of the at least one object oriented class; and the controller operates the print engine in accordance with the script.

10. The printer as set forth in claim 8, wherein the controller is connected to the one or more computers via a computer network system which is utilized to convey the one or more printerlets and data to the printer.

11. The printer as set forth in claim 8, wherein each object oriented class includes one or more procedures which operate on the data.

12. A printer connectable to one or more computers, the printer comprising:

control means integral to the printer connected to one or more computers for receiving therefrom one or more printerlets and data;

computer storage means connected to the control means and storing therein a plurality of object oriented classes invocable by the control means, each object oriented class configured to control at least one operation of the printer; and print means connected to the control means, the print means printing data on print media in response to receiving commands from the control means, wherein:

the control means is responsive to the one or more printerlets for causing at least one object oriented class to be invoked for processing the data;

the control means processes the data as a function of the invoked object oriented class; and the control means issues commands to the print means as a function of the processing of the data.

13. A printer connectable to one or more computers, the printer comprising:

control means connected to one or more computers for receiving therefrom one or more printerlets and data;

computer storage means connected to the control means and storing therein a plurality of object oriented classes invocable by the control means, each object oriented class configured to control at least one operation of the printer; and print means connected to the control means, the print means printing data on print media in response to receiving commands from the control means, wherein:

the control means is responsive to the one or more printerlets for causing at least one object oriented class to be invoked for processing the data;

the control means processes the data as a function of the invoked object oriented the control means issues commands to the print means as a function of the processing of the data;

the control means invokes a port monitor class which monitors for incoming data including printerlets and data;

in response to detecting a printerlet in the incoming data, the port monitor class causes the control means to invoke an interpreter for interpreting the printerlet;

the control means instantiates a print job having a script that includes the name of at least one object oriented class that was included in the script as a function of the invocation of the interpreted printerlet; and the control means processes the data in accordance with the script.

14. The printer as set forth in claim 13, wherein:

as a function of the invocation of the interpreted printerlet, the control means adds to the computer storage means a new object oriented class; and the control means invokes the new object oriented class as a function of the data type of the data.

15. A printer connectable to one or more computers, the printer comprising:

control means connected to one or more computers for receiving therefrom one or more printerlets and data;

computer storage means connected to the control means and storing therein a plurality of object oriented classes invocable by the control means, each object oriented class configured to control at least one operation of the printer; and print means connected to the control means, the print means printing data on print media in response to receiving commands from the control means, wherein:

the control means is responsive to the one or more printerlets for causing at least one object oriented class to be invoked for processing the data;

the control means processes the data as a function of the invoked object oriented class;

the control means issues commands to the print means as a function of the processing of the data;

the control means invokes a port monitor class which monitors for incoming data including printerlets and data;

in response to detecting a printerlet in the incoming data, the port monitor class causes the control means to invoke an interpreter for interpreting the printerlet;

as a function of the invocation of the interpreted printerlet, the control means adds to the computer storage means a new object oriented class; and the control means invokes the new object oriented class as a function of the data type of the data.

16. The printer as set forth in claim 15, wherein:

the control means instantiates a print job having a script that includes the name of at least one object oriented class that was included in the script as a function of the invocation of the interpreted printerlet; and the control means processes the data in accordance with the script.

17. A method of controlling a printer, the method comprising the steps of:

(a) providing a printer having memory including a plurality of object oriented classes stored therein, with each class configured to control at least one operation of the printer;

(b) associating a virtual input port in the memory with a physical input port of the printer;

(c) receiving data at the virtual input port;

(d) invoking at least one object oriented class as a function of the type of data;

(e) processing the data as a function of the at least one invoked object oriented class; and (f) printing the processed data on print media.

18. The method as set forth in claim 17, further including the steps of:

receiving at the virtual input port a printerlet having at least one printer configuration instruction;

invoking each printer configuration instruction; and invoking another one of the object oriented classes as a function of at least one invoked printer configuration instruction.

19. A method of controlling a printer, the method comprising the steps of:
- (a) providing a printer having memory including a plurality of object oriented classes stored therein, with each class configured to control at least one operation of the printer;
- (b) associating a virtual input port in the memory with a physical input port of the printer;
- (c) receiving data at the virtual input port;
- (d) invoking at least one object oriented class as a function of the type of data;
- (e) processing the data as a function of the at least one invoked object oriented class;
- (f) printing the processed data on print media;
- (g) receiving at the virtual input port a printerlet having at least one printer configuration instruction;
- (h) invoking each printer configuration instruction;
- (i) invoking another one of the object oriented classes as a function of at least one invoked printer configuration instruction;
- (j) detecting for the presence of a printerlet received with the data;
- (k) in response to detecting the printerlet, invoking a printerlet processing routine which reads, loads, and instantiates each printer configuration instruction in the detected printerlet;
- (l) creating a print job class that includes a script for processing the data, where the script includes the name of the other at least one object oriented class which was included in the script as a function of at least one printer configuration instruction; and
- (m) processing the data as in accordance with the script.

20. The method as set forth in claim 17, wherein the plurality of object oriented classes includes:
- a sniffer class having one or more sniffer objects for detecting the type of data received at the virtual input port;
- a plurality of page description language (PDL) classes, with each PDL class associated with a sniffer object; and
- a plurality of layout manager classes, with each layout manager class for converting the received data from a virtual page to a physical page.

* * * * *

UNITED STATES PATENT AND TRADEMARK OFFICE
CERTIFICATE OF CORRECTION

PATENT NO. : 6,999,188 B1
APPLICATION NO. : 09/699885
DATED : February 14, 2006
INVENTOR(S) : Steven M. Ashe It is certified that error appears in the above-identified patent and that said Letters Patent is hereby corrected as shown below:

Column 13,
Line 53, "object oriented the control" should read
-- object oriented class;
the control means issues... --.

Signed and Sealed this

Twenty-seventh Day of June, 2006

JON W. DUDAS
*Director of the United States Patent and Trademark Office*